United States Patent [19]

Reamey

[11] Patent Number: 5,113,272
[45] Date of Patent: May 12, 1992

[54] THREE DIMENSIONAL SEMICONDUCTOR DISPLAY USING LIQUID CRYSTAL

[75] Inventor: Robert H. Reamey, Palo Alto, Calif.

[73] Assignee: Raychem Corporation, Menlo Park, Calif.

[21] Appl. No.: 479,005

[22] Filed: Feb. 12, 1990

[51] Int. Cl.⁵ .................................................. G02F 1/13
[52] U.S. Cl. ........................................ 359/53; 359/51; 359/52; 359/98; 340/716
[58] Field of Search ............... 350/335, 334, 347, 349; 340/716, 784; 359/51, 52, 53, 98

[56] References Cited

U.S. PATENT DOCUMENTS

| 2,594,903 | 4/1952 | Freedman et al. | |
| 2,749,480 | 6/1956 | Ruderfer | |
| 3,605,594 | 9/1971 | Gerritsen | |
| 3,954,325 | 4/1976 | Borden | 350/334 |
| 4,246,302 | 1/1981 | Benton et al. | 428/1 |
| 4,396,250 | 8/1983 | Wada et al. | 350/335 |
| 4,448,823 | 5/1984 | Clifford | 428/1 |
| 4,484,187 | 11/1984 | Brown et al. | 340/703 |
| 4,509,043 | 4/1985 | Mossaides | 340/721 |
| 4,556,286 | 12/1985 | Uchida et al. | 350/335 |
| 4,659,182 | 4/1987 | Aizawa | 350/335 |
| 4,670,744 | 6/1987 | Buzak | 340/746 |
| 4,726,663 | 2/1988 | Buzak | 350/335 |
| 4,878,741 | 11/1989 | Fergason | 350/334 |

FOREIGN PATENT DOCUMENTS

| 0022217 | 1/1981 | European Pat. Off. | 350/335 |
| 0022311 | 1/1981 | European Pat. Off. | 350/335 |
| 0336351A2 | 10/1989 | European Pat. Off. | |
| 0153599 | 12/1979 | Japan | 350/335 |
| 62-235929 | 10/1987 | Japan | |
| 2024443 | 1/1980 | United Kingdom | 350/335 |
| 2066498 | 7/1981 | United Kingdom | |

OTHER PUBLICATIONS

Thomas S. Buzak, "CRT displays full-color 3-D images" SID Digest, pp. 345-347, Aug. 1985.
Tamura et al., Applied Optics 21 (20), 3659 (1982).
Tamura et al., Applied Optics 17 (23), 3695 (1978).
Patent Abstracts of Japan, vol. 12, no. 102 (P-684)[2949] (Apr. 1988) (abstract of JP 62-235,929, Stanley Electric).
Patent Abstacts of Japan, vol. 10, no. 116 (P-452)[2173] (Apr. 1986) (abstract of JP 60-244,924, Citizen Tokei).

Primary Examiner—William Mintel
Assistant Examiner—Tan Ho
Attorney, Agent, or Firm—Yuan Chao; Herb Burkard

[57] ABSTRACT

A display presenting a three-dimensional visual effect, has (I) a plurality of stacked layers of a display material containing a plurality of pixels which are each independently switchable from a first visual state to a second visual state, each layer having pixels of the same color or combination of colors; (II) switching means for independently switching each pixel from the first visual state to the second visual state; and (III) separating means for providing a separation between adjacent layers of display material. If the number of layers of display material is less than four, the separation between adjacent layers is at least 0.5 mm. Preferably, the display material is encapsulated liquid crystal material.

8 Claims, 5 Drawing Sheets

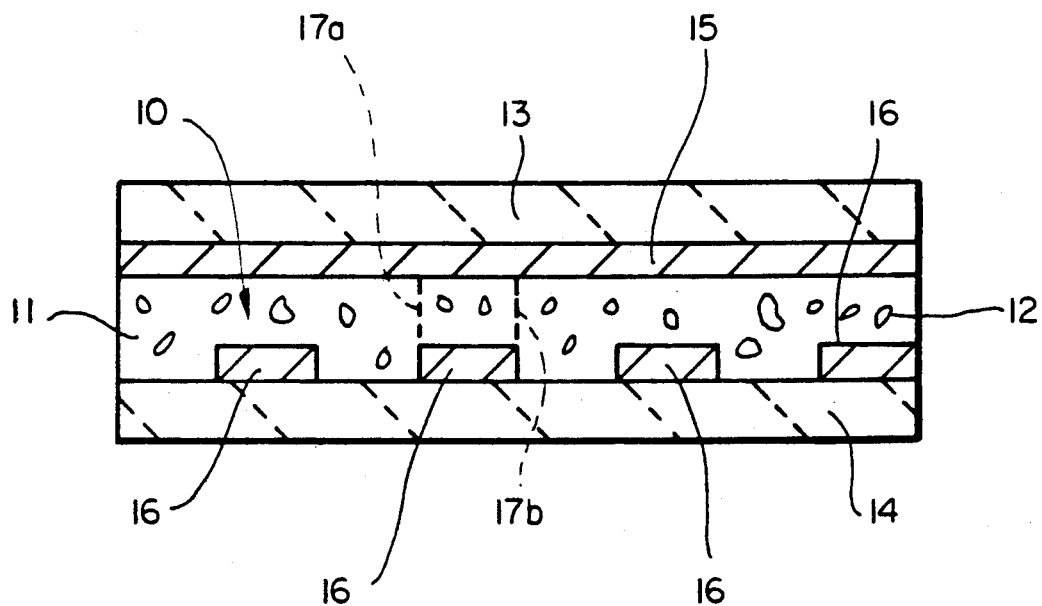
FIG_1
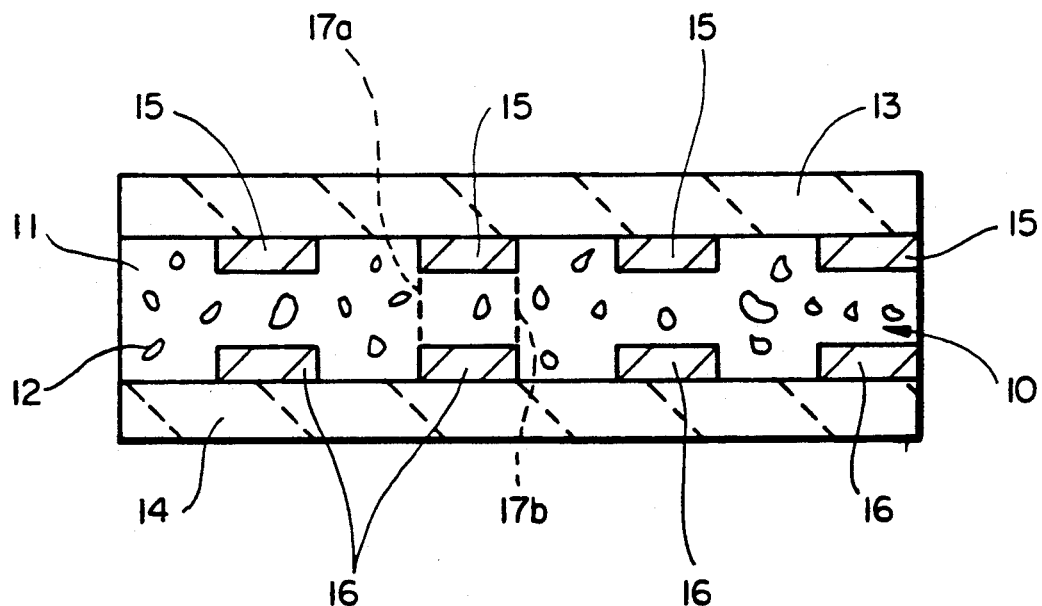
FIG_1a

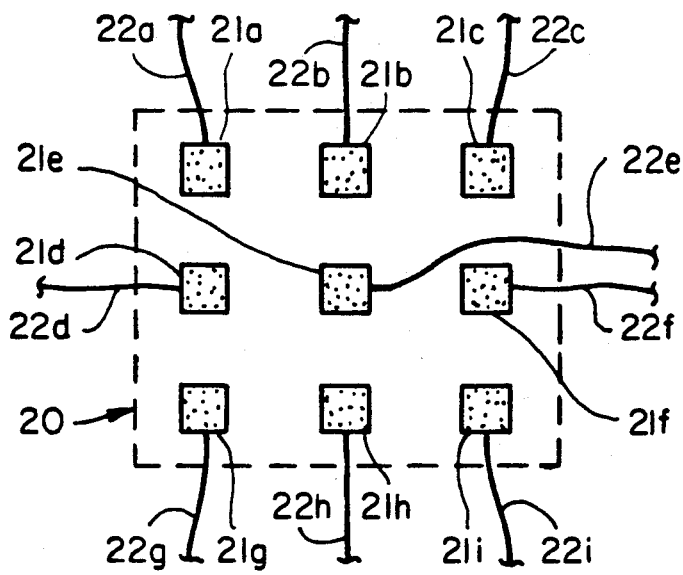
FIG_2a
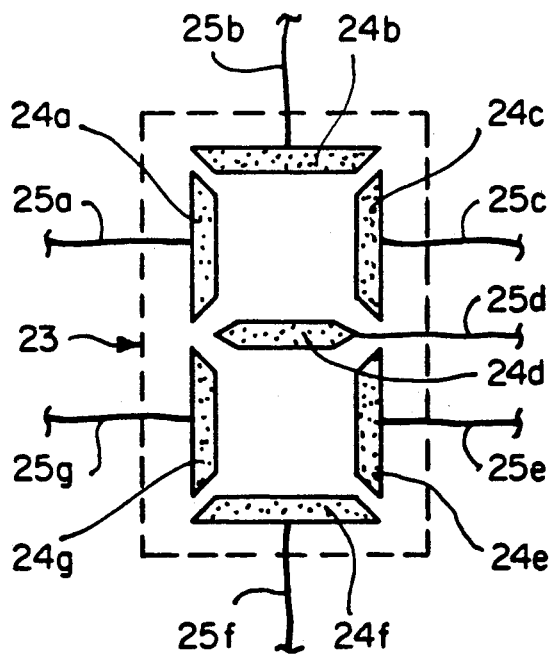
FIG_2b

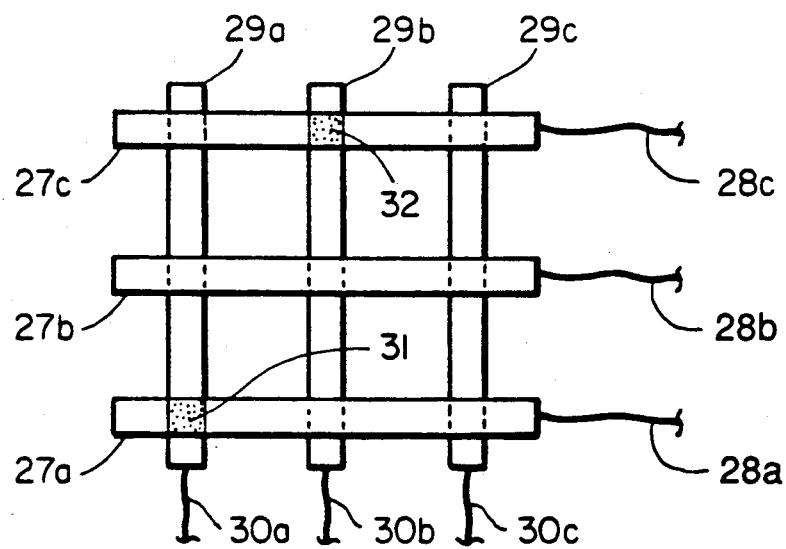
FIG_2c
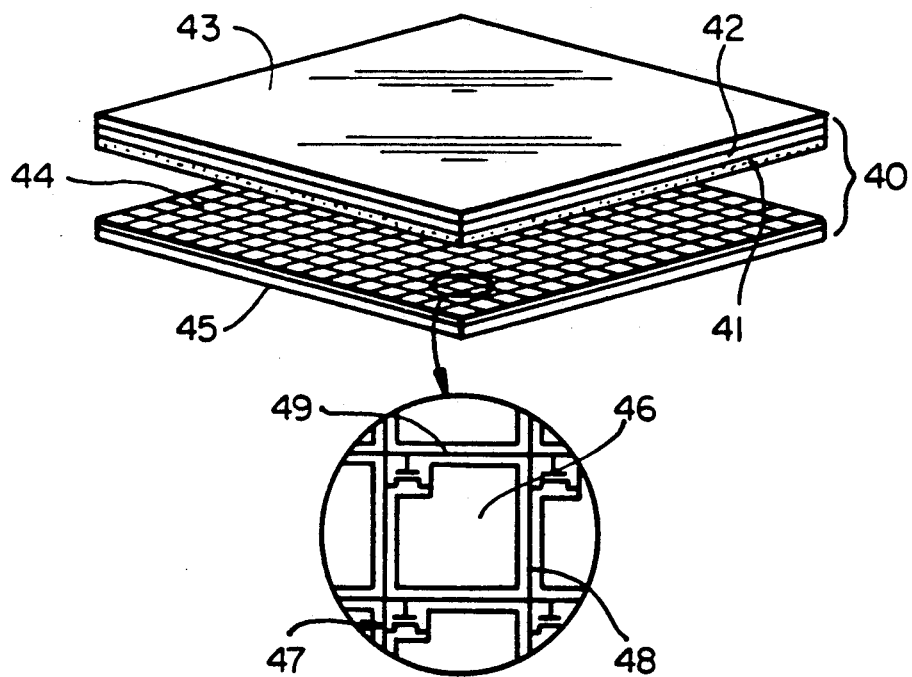
FIG_3

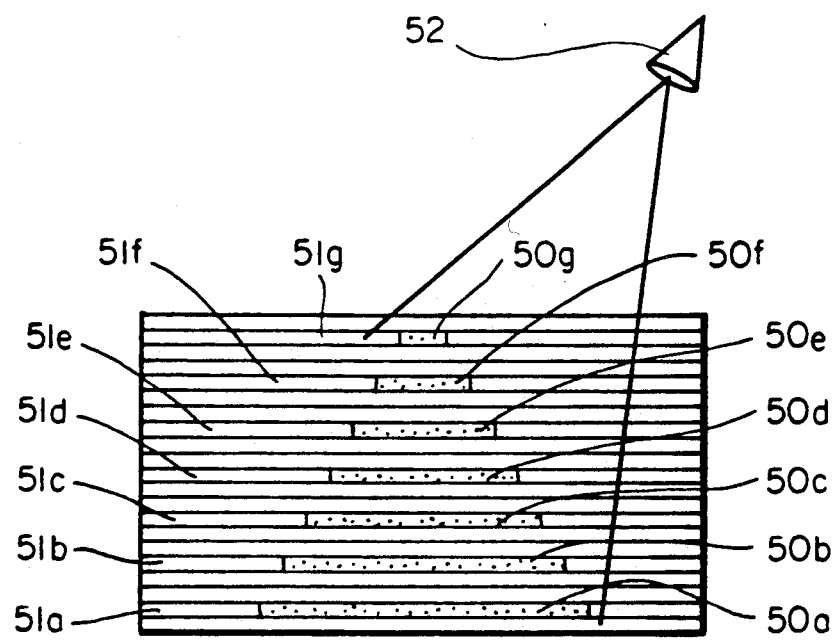
FIG_4a
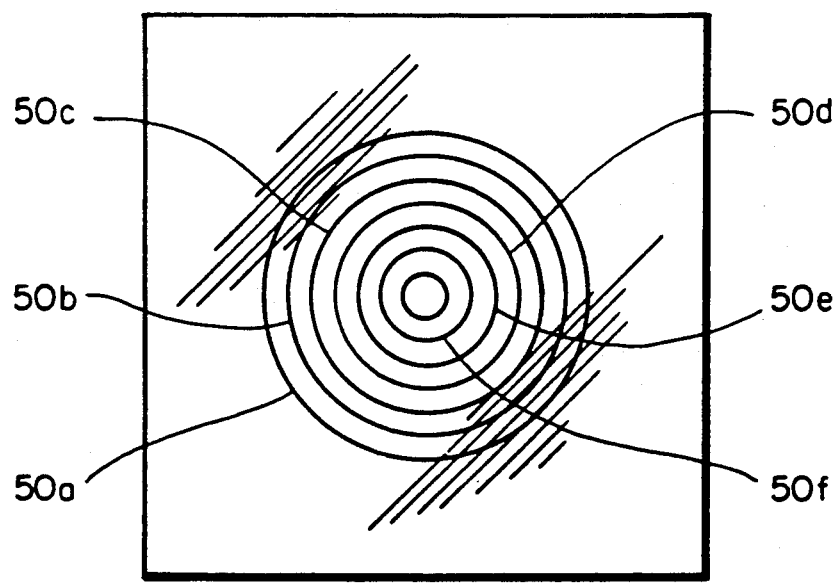
FIG_4b

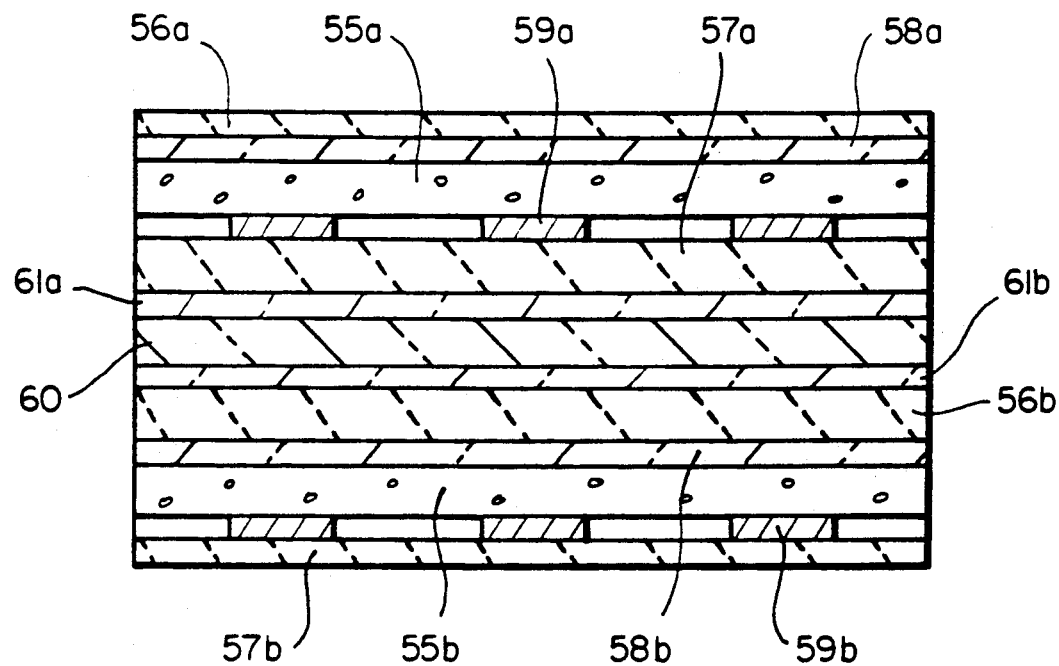
FIG_5
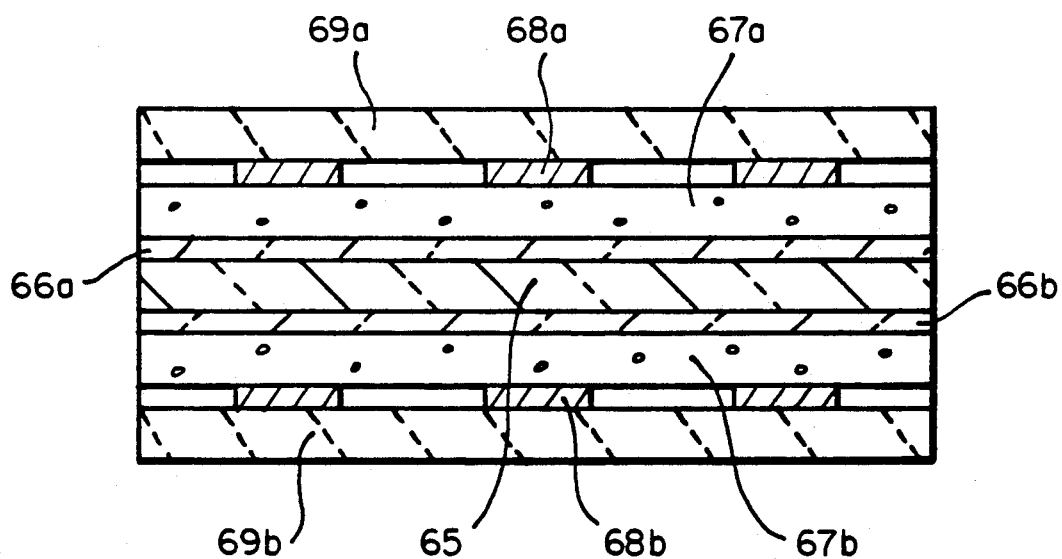
FIG_6

THREE DIMENSIONAL SEMICONDUCTOR DISPLAY USING LIQUID CRYSTAL

BACKGROUND OF THE INVENTION

This invention relates to a display a presenting three dimensional visual effect.

A number of three-dimensional (3D) displays are known. They may be broadly classified into two types: (1) fixed viewing direction ones and (2) real 3D image ones. In a fixed viewing direction display, the 3D image is viewed from one direction only—when the viewer moves around the displayed image, the image does not change. Perspective and binocular displays are examples of fixed viewing direction displays. A real 3D image display permits the viewer to have a side view of the object when moving around the image. That is, the 3D effect is preserved even when the viewer changes the viewing angle. Holography, internal photography, and varifocal mirror displays generate real 3D images.

Tamura et al., Applied Optics 21(20), 3659 (1982), disclose a multilayer 3D display comprising multiple layers of images, in which each image layer is placed at a different optical path length position from a viewing window by a multidirectional beam splitter, to show a composite 3D image.

Buzak, U.S. Pat. No. 4,670,744 (1987), discloses a light reflecting 3D display system. A light source provides a sequence of images, each representing a different depth plane of a subject. Each of the images is selectively reflected from one of a plurality of differently positioned light direction modulators, to synthesize a 3D image of the subject.

Ruderfer, U.S. Pat. No. 2,749,480 (1956), discloses an apparatus for producing 3D visual patterns. The apparatus comprises a plurality of illuminable points or zones determining a cubical or spherical volume. The light points are equipped with electrically operated lamp means and switch means for selectively choosing the lamp means to be actuated.

Additional devices which are of interest because of their multilayered construction but which however are not three dimensional display devices are disclosed by Fergason, WO 86/05282 (1986); Aizawa, U.S. Pat. No. 4,659,182 (1987); Clifford, U.S. Pat. No. 4,448,823 (1984); and Benton, U.S. Pat. No. 4,246,302 (1981).

Fergason discloses a complementary color display device having color layers of encapsulated liquid crystal material, so that light reaching an observer's eyes passes through the layers. By selectively switching the transparency of the colored layers, the observed light is colored or not.

Aizawa discloses a multilayered matrix-type liquid crystal display, comprising front and rear substrates and at least one intermediate substrate interposed therebetween, with liquid crystal layers interposed between the substrates. Switching of the liquid crystal material is effected by intersecting signal and scanning electrodes arranged on opposed mutually facing surfaces of the intermediate and rear substrate and of the intermediate and front substrate. Color layers are arranged in an optical path corresponding to the intersecting portions of the signal and scanning electrodes, but on the opposite side of the intermediate substrate on which the associated intersecting signal and scanning lines are located.

Clifford discloses a multicolored liquid crystal display device, including layered color units. Each colored unit includes either a standard liquid crystal display unit and a colored polarized filter, or a dichroic liquid crystal display unit. By selectively energizing one or more of the liquid crystal displays, display characters of varying colors can be produced.

Benton discloses a multi-band liquid crystal film for visual observation of two or more patterns, prepared by laminating at least two polyurethane films, each containing discrete aggregates of liquid crystals against a black film, such that the visual response of the liquid crystals of each succeeding film is different from that of the other films.

The prior art 3D display devices are disadvantageous in that they are rather bulky, require expensive optics, and/or are unable to present an image which changes or "moves" with time. I have made a three dimensional display device which can generate real 3D images without the need for special glasses or other visual aids, but which is compact and simple to construct. The device of this invention is dynamic, as opposed to static; that is, it can present different 3D images, or even moving 3D images in real time.

SUMMARY OF THE INVENTION

This invention provides a display presenting a three-dimensional visual effect, comprising (I) a plurality of stacked layers of a display material containing a plurality of pixels which are each independently switchable from a first visual state to a second visual state, each layer having pixels of the same color or combination of colors; (II) switching means for independently switching each pixel from the first visual state to the second visual state; and (III) separating means for providing a separation between adjacent layers of display material; provided that if the number of layers of display material is less than four, the separation between adjacent layers is at least 0.5 mm.

BRIEF DESCRIPTION OF THE DRAWINGS

FIGS. 1 and 1a depict schematically in cross-section an encapsulated liquid crystal material which can be used for devices of this invention.

FIGS. 2a-c depict various electrode patterns for addressing the display material.

FIG. 3 depicts another addressing scheme, this one using multiplexed active matrix elements.

FIGS. 4a and 4b depict schematically how the multiple layers of display material in this invention are used to form an image having presenting a three-dimensional visual effect.

FIG. 5 depicts schematically a multiple layer construction, with spacers, for a display of this invention.

FIG. 6 depicts another preferred multiple layer construction.

DESCRIPTION OF PREFERRED EMBODIMENTS

Normally, the pixels in the display material are switched from the first visual state to the second visual state by the application or removal of an electric field or by the passage of current. For example, in the first visual state the pixels may be nontransparent—strongly absorb and/or scatter incident light, or interact with incident light so as to cause it to be absorbed by associated elements such as polarizers—while in the second visual state the pixels may be substantially transparent, permitting the incident light to be reflected back to the viewer by a reflector located behind them or permitting, in the case of a back-lit display, that light pass through the display and reach the viewer.

In a preferred embodiment of this invention, the layers of display material comprise an encapsulated liquid crystal material, whose preparation is disclosed in U.S. Pat. Nos. 4,435,047 (1984), 4,606,611 (1986), 4,616,903 (1986), and 4,707,080 (1987), all to Fergason; published European patent No. 4,671,618 (1987), to Wu et al.; U.S. Pat. Nos. 4,73,255 (1987) and 4,685,771 (1987), to West et al.; and U.S. Pat. No. 4,688,900 (1987) to Doane et al.; the disclosures of each which are incorporated herein by reference. In encapsulated liquid crystal material, discrete volumes of liquid crystals are encapsulated, dispersed, embedded or otherwise contained in a containment medium. "Liquid crystals" denotes a composition having liquid crystalline properties, whether that composition is a single discrete liquid crystalline compound, a mixture of different liquid crystalline compounds, or a mixture of liquid crystalline and non-liquid crystalline compounds.

Liquid crystals have typically elongated molecular shapes, with a tendency to align or orient themselves with their long molecular axes parallel to each other. This alignment causes liquid crystals to be anisotropic, meaning that their measured physical, optical, and other properties are dependent on the direction of measurement (parallel or perpendicular to the direction of alignment). Further, the alignment direction can be influenced by an external stimulus, such as an electrical or magnetic field, causing the liquid crystals to exhibit a particular value of a physical characteristic in one direction when the stimulus is absent, but rapidly switching to a different value when the stimulus is applied. It is because of their anisotropy and their ready realignment that liquid crystals are useful as materials for displays.

The containment medium is preferably a polymeric material. Suitable containment media include but are not limited to poly(vinyl alcohol), polyurethane, acrylic and methacrylic polymers and copolymers, epoxies, polyoelfins, vinyl polymers, and the like.

Encapsulated liquid crystal material can be formed by deposition from an emulsion containing both the containment medium and liquid crystals or by the evaporation of liquid from a solution containing both containment medium and liquid crystals. It can also be formed by making an initially homogeneous mixture containing both containment medium and liquid crystals at an elevated temperature, then cooling to phase-separate out liquid crystal volumes contained in the containment medium. Further, it can be formed by an in-situ polymerization process, in which the containment medium is polymerized and simultaneously encapsulates liquid crystal material. The liquid crystal need not be entirely surrounded by the polymer, and may exist as part of a system with co-continuous phases.

In one embodiment, the encapsulated liquid crystal material is substantially non-transparent in the absence of a sufficient electric field (the "field-off" state) and substantially transparent in the presence of a sufficient electric field (or "field-on" state) The electric field induces a change in the alignment of the liquid crystals, in turn causing the encapsulated liquid crystal material to switch from a highly light-scattering (and/or absorbent) state to a highly non-scattering and substantially transparent state. Generally, it is preferred that the liquid crystals have a positive dielectric anisotropy and that the ordinary index of refraction of the liquid crystals be matched with the refractive index of the containment medium, while the extraordinary index of refraction is substantially mismatched therewith. The physical principles by which such encapsulated liquid crystal material operates is described in further detail in the aforementioned references, particularly the patents to Fergason. In those portions of the encapsulated liquid crystal material to which a sufficient electric field is applied, the transition from a non-transparent state to a transparent state occurs, while adjacent areas to which no electric field has been applied remain non-transparent.

Pleochroic dyes have been mixed with liquid crystals to form a solution therewith. The molecules of pleochroic dyes generally align with the molecules of liquid crystals, so that the application of the electric field affects not only the predominant alignment of the liquid crystals, but also of the pleochroic dye. As the extent of the absorption of incident light by the pleochroic dye depends on its orientation relative to the incident light, the application of an external stimulus to a liquid crystal-pleochroic dye combination also provides a means for the controlled attenuation of light. (Thus, as used herein, the term "liquid crystals" also means, in context, liquid crystals containing pleochroic dye dissolved therein.) Pleochroic dyes may be used in encapsulated liquid crystals, as described in the aforementioned Fergason patents, or in non-encapsulated systems, as described in Goldmacher et al., U.S. Pat. No. 3,499,702 (1970) and Heilmeier, U.S. Pat. No. 3,551,026 (1970). Thus, color images can be created by using pleochroic dyes, with arrays of individually colored pixels within each layer being created by selective deposition, for example by screen printing. Thus, a layer capable of displaying colored images can be formed by depositing side by side red, blue, and green pixels. Alternatively, for a monochromic (sometimes called black and white) display, the pixels need not be colored, and can simply switch between a substantially transparent state and a substantially non-transparent state which is black or gray. Preferably, at least two of the display material layers are the same; that is, have pixels with the same chromatic characteristics—all black-and-white pixels, all pixels of the same color, or the same groupings of red, green, and blue pixels. More preferably, each of the display material layers in the display are the same.

The means for applying the electric field and switching each pixel from its substantially non-transparent state to its substantially transparent state may be various. Generally, the display material has an electrically conductive material or electrode on either side. The application of a sufficient voltage across the two electrodes then induces a corresponding change in the visual appearance of the display material between the electrodes. Each pixel is defined by the area of overlap between the two electrodes. Direct addressing, meaning there is one independently addressable line for each pixel, may be used. Multiplexing, combining rows of independently addressable strips of electrode material on one side of the display material and columns of independently addressable strips of electrode material on the other side, may also be used. Active matrix addressing, utilizing non-linear electrical devices at each pixel, represents yet another way of addressing the pixels. Suitable active matrix devices include transistors (particularly thin-film transistors or TFT's), back-to-back diodes, metal-insulator-metal (or MIM) devices, and varistors.

A more detailed description of these addressing methods and various preferred embodiments of this invention is provided by the figures. Turning now to FIG. 1, there is shown an encapsulated liquid crystal material 10, comprising a containment medium 11 containing discrete volumes of liquid crystals 12. Transparent support materials 13 and 14 (made of, for example, glass, plexiglass, or a polyester such as polyethylene terephthalate) provide support for the encapsulated liquid crystal material 10 and electrodes 15 and 16. Electrode 15 is a ground plane electrode substantially coextensive with the encapsulated liquid crystal material, while electrodes 16 are patterned in a desired pattern. Each pixel is defined by the overlap between electrode 15 and the corresponding electrode 16, as illustrated in one instance by dotted reference lines 17a and 17b. Electrodes 15 and 16 may be made of a transparent electrically conductive material, such as indium tin oxide (ITO) or a vapor deposited thin coating of a metal such as nickel or gold.

If desired, the top electrode 15 may also be patterned, as illustrated in FIG. 1a. In this figure, the top electrode is now depicted as a pattern of electrodes 15. Numerals 10, 11, 12, 13, 14, 16, and 17a-b retain the same significance as in FIG. 1.

FIG. 2a-c depict some common electrode patterns. In FIG. 2a, there is depicted a regular array 20 of electrodes 21a-i, each addressed by its own lead 22a-i, respectively. FIG. 2b depicts the familiar seven-segment figure-eight pattern 23 found in watches, calculators and other devices requiring a digital numerical display. Each of segments 24a-g is addressed by its own lead 25a-g, respectively. By the selective switching on and off of the appropriate combination of segments 24a-g, any of the numerals 0-9 may be displayed. In addition to these electrode patterns, any other pattern or shaped picture element may be used to represent a portion of a three dimensional object. While FIG. 2a and 2b use a direct addressing FIG. 2c depicts an electrode pattern 26 in which multiplexing is used. Rows of top electrodes 27a-c, each connected to respective leads 28a-c, are superimposed on columns of bottom electrodes 29a-c. By the application of a voltage across selected top and bottom electrodes, particular pixels, defined by the overlap between the electrodes, can be switched. For example, by application of a voltage across electrodes 27a and 29a, pixel 31 can be switched, while by the application of a voltage across electrodes 27c and 29b, pixel 32 can be switched.

In another addressing scheme, an array of multiplexed active matrix devices may be employed. Such a scheme is illustrated in FIG. 3, in an exploded view, with TFT's as the active matrix devices. FIG. 3 depicts a sandwich 40 of encapsulated liquid crystal material 41 between a first support material 43 coated with a transparent ground plane electrode 42 (made for example from ITO) and a second support material 45 (typically glass) having thereon an array 44 of multiplexed TFT's. The construction of the array is shown in greater detail in the magnified portion of FIG. 3. Each pixel is defined by an electrode 46 (made for example from ITO). The application of a voltage across each electrode 46 is controlled by a TFT 47. In turn, each TFT is address in a multiplexed fashion via scan line 49 and data line 48.

The manner in which the three-dimensional visual effect is achieved by the display of this invention is shown schematically in FIGS. 4a-4b. Seven layers of display material 51a-g, which are independently addressable by a means such as described hereinabove, have selected portions 50a-g in the opaque state (that is, in the field-off state, if the display material is an encapsulated liquid crystal material, to form the image of a cone. The balance of the display material is in a transparent (field-on) state. An observer can see through to the bottom layers where the display material is transparent. Although in FIGS. 4a-b the observer is shown viewing the display from above, a three dimensional effect can also be obtained by viewing from below. When viewed from oblique angles, the three-dimensional perspective is maintained, allowing the observer to inspect the cone from different orientations. The relative dimensions of the displayed object will remain true at all viewing angles, eliminating the distortions seen in conventional three-dimensional displays.

The minimum number of layers of display material is two, but preferably there are at least four, more preferably at least eight layers. A desirable number of layers, from the viewpoint of providing an attractive 3D effect but yet keeping the device relatively simple, is between 4 and 20.

The stacked multiple layers of the display material can be almost touching, or spaced apart. It is generally desirable to space the layers apart in order to maximize parallax and consequently the three-dimensional effect. Where the device has less than four layers, it is especially important to keep the spacing between adjacent layers sufficiently large to provide a sufficient parallax effect. Accordingly, in such embodiments the spacing between adjacent layers are preferably at least equal to the smallest average dimension of the pixels. The separation between the adjacent layers is preferably at least 0.5 mm, more preferably at least 1 mm. The spacing means may perform the additional function of being a substrate or supporting means for the display material and/or the electrodes or other electronic components for addressing the display material. Naturally, in order to permit viewing of the lower layers of display material, the spacing means should be substantially transparent. In another embodiment, the spacing means does not physically span all the gaps between adjacent layers, but is instead positioned only along the edges or at selected intervals, with the space in between filled with air or other suitable filler material. Preferably, the refractive index of the spacing means of the filler material is substantially equal (preferably within ±0.05) to the refractive index of the display material or to the refractive index of the materials which it contacts—e.g., the support materials 56a-b and 57 a-b of FIG. 5, discussed below—to minimize reflection losses through the layers and/or distortion due to refraction. Silicone oil and other viscous, clear liquids are preferred filler material in those embodiments in which the display material is encapsulated liquid crystal material. Other preferred materials are pressure sensitive adhesives and clear gels.

FIG. 5 shows an embodiment having filler materials between adjacent layers. For simplicity, only two layers of display material are shown, but additional layers may be constructed in like fashion. Display material layers 55a-b are sandwiched between support materials 56a-b and 57a-b, made for example from glass, plexiglass, or poly(ethylene terephthalate (PET)). Support materials 56a-b are coated with unpatterned transparent electrodes 58a-b (made for example from ITO), as ground plane electrodes, on the side facing the display material. Support materials 57a-b are coated with patterned electrodes 59a-b, also permissibly made from ITO. The application of a voltage at selected portions of patterned electrodes 59a-b causes the display material between those portions and unpatterned electrodes 58a-b to switch from one optical state to another. A spacing material 60, which can be made from plexiglass, is located between the two layers. There are further refractive index matching spacer materials 61a-b (e.g., silicone oil) between the spacing material 60 and the layers of display material.

It is possible to use a "double layer" construction in which a single material between the layers of display material doubles as a support material and a spacing means. Such an embodiment is shown in FIG. 6. Transparent material 65 is coated on either side with unpatterned transparent electrodes 66a-b, which serve as ground plane electrodes. These electrodes contact display materials 67a-b, respectively, which in turn, on their other sides are contacted by patterned electrodes 68a-b supported by support materials 69a-b.

The displayed three dimensional images can be static, or can be moving images, the movement of the image being created by addressing different sets of pixels at different times. With encapsulated liquid crystals the switching times can be less than 30 milliseconds, providing flicker-free video type movement in the three dimensional image.

Lenticular screens or other lenses can be used in conjunction with the display to enhance the visual experience.

Displays which require polarizers, for example of the twisted nematic liquid crystal type, can be used, although they are not preferred. This is because even in the transparent state the polarizer will pass through only 50% of the incident unpolarized light. Additional losses may occur when the light passes through subsequent polarizers. If a twisted nematic construction is employed, the polarizers in successive layers should be all aligned parallel to each other, to minimize the attenuation of light by the polarizers. Further, twisted nematic displays generally have a reflector at their back, in which case the reflector should not randomize the polarization of light passing through the layers of display material above it. The reflector can be a specular reflector.

The display can be illuminated from the front (i.e., the same side as the observer), the edges, or the back, or all three. A reflector (specular, diffuse, or containing a pattern or picture) can be used behind the display. Embodiments employing highly absorbing display material do not work as well with front lighting as they do with back lighting. Forward scattering systems appear opaque, but actually allow significant amounts of light to pass up to subsequent layers. Several sources of light can be used concurrently. The lights can be directed towards specific portions of the display, enhancing contrast and/or the 3D effect and providing means for generating color images. The multiple sources of light can be brought in from front, back, or side. Light sources can be incandescent bulbs, lasers, arc lamps, and the like. The 3D effect can be in the visible region, or outside the visible region into the infra-red or near ultraviolet.

I claim:

1. A display presenting a three-dimensional visual effect, comprising (I) a plurality of stacked layers of a display material comprising encapsulated liquid crystal material and containing a plurality of pixels which are each independently switchable from a first visual state to a second visual state, each layer having pixels of the same color or combination of colors; (II) switching means for independently switching each pixel from the first visual state to the second visual state; (III) separating means for providing a separation between adjacent layers of display material; provided that where the number of layers of display material is less than four, the separation between adjacent layers is at least 0.5 mm and (IV) filler material which fills the separation between adjacent layers and has a refractive index substantially equal to that of the adjacent layers.

2. A display according to claim 1, wherein each pixel is directly addressed.

3. A display according to claim 1, wherein each pixel is addressed by an active matrix.

4. A display according to claim 3, wherein the active matrix comprises thin film transistors, back-to-back diodes, or MIM's.

5. A display according to claim 3, wherein the active matrix comprises varistors.

6. A display according to claim 1, wherein the display material further comprises pleochroic dye mixed with the liquid crystals.

7. A display according to claim 1, wherein the display has at least four layers of display material.

8. A display according to claim 1, wherein the display has between 4 and 20 layers of display material.

* * * * *